A. W. ROSS.
Hand-Cultivators.

No. 144,927.  Patented Nov. 25, 1873.

Witnesses:
E. Wolff
O. Sedgwick

Inventor:
A. W. Ross
Per
Attorneys.

UNITED STATES PATENT OFFICE.

AMOS W. ROSS, OF NORTHFIELD, MASSACHUSETTS.

IMPROVEMENT IN HAND CULTIVATORS.

Specification forming part of Letters Patent No. 144,927, dated November 25, 1873; application filed September 13, 1873.

*To all whom it may concern:*

Figure 1:
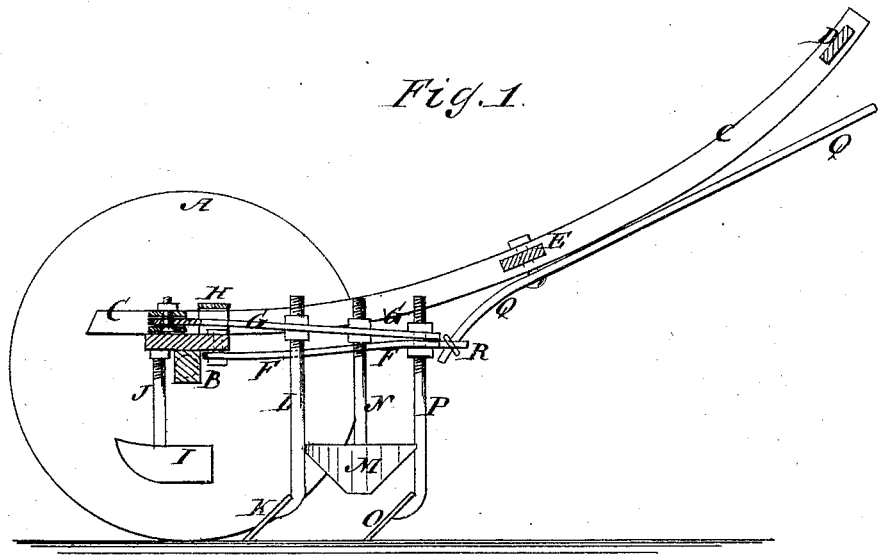
Figure 2:
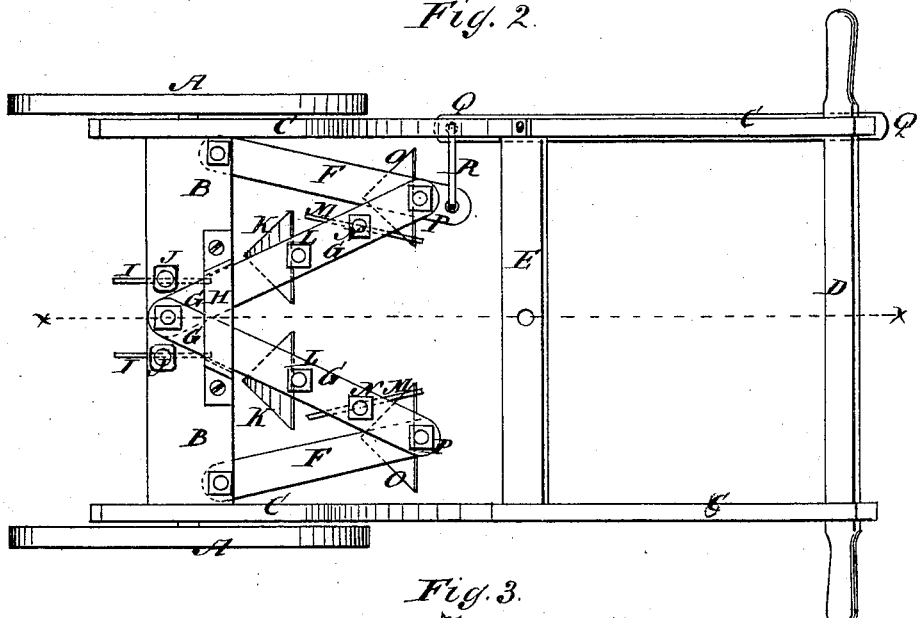
Figure 3:
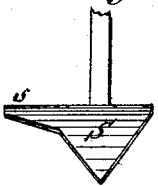

Be it known that I, AMOS W. ROSS, of Northfield, in the county of Franklin and State of Massachusetts, have invented a new and useful Improvement in Hand Cultivator, of which the following is a specification:

Figure 1 is a vertical longitudinal section of my improved cultivator taken through the line $x\ x$, Fig. 2. Fig. 2 is a top view of the same. Fig. 3 represents a modified form for the plows.

Similar letters of reference indicate corresponding parts.

My invention has for its object to furnish an improved hand cultivator, for cultivating various plants planted in rows and drills, and which shall be simple in construction, convenient in use, and effective in operation. The invention relates to a certain combination of parts, as hereinafter described, and specifically indicated in the claim.

A are the wheels, which revolve upon the journals of the axle B. To the axle B, or to a board attached to said axle, is secured the forward ends of the handles C, the outer ends of which are connected by a cross-bar, D, which serves as a handle in operating the machine. The middle parts of the handles C are connected by a cross-bar, E, to give them greater rigidity. To the forward parts of the handles C, or to the end parts of the axle B, or to both, are pivoted the forward ends of the bars F, the rear ends of which are pivoted to the rear ends of the bars or beams G. The forward ends of the bars G are pivoted to each other, and pass through and work in a keeper, H, attached to the axle or board B. I are guards attached to the standards J, which are secured to the axle or board B, upon each side of and at a little distance from its center. The guards I are designed to prevent the plants, when small, from being covered or injured by the soil thrown by the plows K. The standards L of the plows K are attached to the bars G. The guides M are designed for hillers, and their standards N are attached to the bars G. The guides M may be adjusted at any desired angle. O are the larger or hilling hoes, the standards P of which are attached to the rear parts of the bars C, and may, in fact, form the pivots that connect the bars F G. To one of the handles C is pivoted a lever, Q, the forward end of which is connected with the pivoted rear ends of the bars F G by a link or other suitable connection, R. The rear end of the lever Q extends back into such a position that it may be conveniently reached by the operator, and operated to adjust the plows wider apart or closer together, as may be required. The standards of the plows and guides have screw-threads cut upon their upper ends, and are secured in place by nuts screwed upon them above and below the bars G, so that the said plows and guides can be readily adjusted or detached, as may be required. The plow S (shown in Fig. 3) is made with a projecting arm or part, $s'$, upon the upper part of one of its side edges, as shown in the drawings, to smooth off the soil in forming the hills.

Having thus described my invention, I claim as new and desire to secure by Letters Patent—

The combination of the wheels A, axle B, handles C, and cross-bar D with the pivoted side bars F, pivoted middle bars G, the plows, the keeper H, guards I, and hillers M, substantially as herein shown and described.

AMOS W. ROSS.

Witnesses:
CHARLES POMEROY,
MARY ANN CHASE.